US006973354B2

United States Patent
Mirelli et al.

(10) Patent No.: US 6,973,354 B2
(45) Date of Patent: Dec. 6, 2005

(54) METHOD AND APPARATUS FOR CONTROLLING AND SUPERVISING ELECTRONIC DEVICES

(75) Inventors: Giacomo Mirelli, Carugate (IT); Giorgio Barzaghi, Vaprio d'Adda (IT); Vincenzo Rodella, Melzo (IT)

(73) Assignee: Alcatel, Paris (FR)

( * ) Notice: Subject to any disclaimer, the term of this patent is extended or adjusted under 35 U.S.C. 154(b) by 838 days.

(21) Appl. No.: 09/898,066

(22) Filed: Jul. 5, 2001

(65) Prior Publication Data

US 2002/0019673 A1 Feb. 14, 2002

(30) Foreign Application Priority Data

Jul. 7, 2000 (IT) .......................... MI2000A1534

(51) Int. Cl.⁷ ........................................... G05B 11/01
(52) U.S. Cl. .................... 700/20; 340/825.21
(58) Field of Search ................ 700/9, 19, 20, 700/100; 340/825.21; 455/7

(56) References Cited

U.S. PATENT DOCUMENTS

| 4,988,989 A | 1/1991 | Goto | |
|---|---|---|---|
| 5,341,131 A * | 8/1994 | Hoshino et al. | 340/825.21 |
| 5,479,406 A | 12/1995 | Matsutani | |
| 6,510,350 B1 * | 1/2003 | Steen et al. | 700/9 |
| 6,728,821 B1 * | 4/2004 | James et al. | 710/306 |
| 2001/0031621 A1 * | 10/2001 | Schmutz | 455/7 |

FOREIGN PATENT DOCUMENTS

| EP | 0 325 080 A1 | 7/1989 |
|---|---|---|
| EP | 0 507 947 A1 | 10/1992 |
| EP | 0 772 107 A2 | 5/1997 |

* cited by examiner

*Primary Examiner*—Leo Picard
*Assistant Examiner*—Alexander Kosowski
(74) *Attorney, Agent, or Firm*—Sughrue Mion, PLLC

(57) ABSTRACT

A method and apparatus for controlling and supervising electronic devices, such as devices that receive, transmit and process signals in radio relay systems. The method comprises the steps of controlling each peripheral unit of the device through a controller; identifying a plurality of data to be handled for carrying out the control and the supervision of the device; and generating/receiving, through said controllers, messages each containing one or more of said data to be handled, wherein it further comprises the step of connecting said controllers via a common bus and wherein the format of said controller- generated/received messages is pre-established and substantially independent of the size of data contained therein.

17 Claims, 4 Drawing Sheets

METHOD AND APPARATUS FOR CONTROLLING AND SUPERVISING ELECTRONIC DEVICES

INCORPORATION BY REFERENCE OF PRIORITY DOCUMENT

This application is based on and claims the benefit of Italian Patent Application No. MI2000A001534, filed on Jul. 7, 2000, which is incorporated by reference herein.

BACKGROUND OF THE INVENTION

1. Field of the Invention

The present invention relates to a method and apparatus for controlling and supervising electronic devices.

2. Description of the Prior Art

The modem systems for the control and supervision of electronic devices have the task of managing a lot of data coming from a variable number of sources. The data that are handled are often greatly heterogeneous with one another, as to both electrical nature and information content, and further they are greatly dependent on the different configurations of the system.

An example of electronic device that must be controlled and supervised could be instruments that receive, transmit and process signals in radio relay systems. In such instruments it is necessary to control the alarms that could be possibly generated, it is necessary to collect and analyze the various operating conditions and to perform configurations.

The strict relation with the controlled apparatus causes the current control and supervision methods and systems to be very specific, hardly re-employable in other applications and moreover of low maintainability in case there are subsequent variations of the system, of the peripheral units or of the data to be managed.

The current main solutions use one of two different control methodologies.

The first methodology, termed distributed-controller methodology, consists in using a number of controllers, with each controller controlling a system portion through a dedicated software program. Therefore, each controller is able to control a definite number of peripheral units. All the controllers are interconnected with a single concentrator with whom they interchange data associated with the controlled peripheral units in the form of messages. The exchanged messages are structured in a different way according to the handled data typology and to the features of the communication protocol that is used. The messages that are handled by each controller will contain only the data essential to the controller to be able to manage the portion of the system assigned thereto and therefore they will have a format and an information content pre-established at the beginning.

The second methodology consists in using a sole very powerful controller able to manage the whole system. All the system peripheral units are mapped to specific addresses and directly driven by means of read and write cycles through a single bus interconnecting them to the controller. Each peripheral unit has at its disposal a number of unique data inside the system. The controller will access any of the available data in the controlled system in a mutually exclusive manner.

Both methodologies exhibit intrinsic drawbacks.

The first control methodology leads to a high number of software programs all different from one another, each of which is dependent not only upon the controlled peripheral units, but also upon the format of the handled messages containing the data associated with the controlled peripheral units. It follows that, in order to control another system having the same data but a different connection between the system peripheral units and the handled data, a complete reorganization of the messages will be necessary, with a consequent poor re-employment of the software which was developed for the first system, notwithstanding it has both the same data and type of peripheral units.

The second control methodology leads to a strict connection between the controller and the peripheral units to be controlled, all the associations between peripheral units and data being defined in the controller software. By excluding the controller from the system, all the system peripheral units become unserviceable since they are not traceable back to any system data. Moreover, the controller has a physical dependence with the peripheral units because it accesses them through an absolute address which is not necessarily associated with the same data in different systems. In such a way, a controller software which is strictly dependent on the controlled system architecture is obtained.

Therefore, in essence, the drawback that is common to all the solutions adopted so far derives from the fact that once the hardware architecture and the necessary peripheral units of the system to be controlled have been defined, a special data format, optimized for that special system architecture and for each handled data topology, should be defined. In this way, an efficient control software is provided but such a software will be hardly re-employable in other hardware architecture systems or with different data typologies.

SUMMARY OF THE INVENTION

It is the main object of the present invention to provide a more efficient method for controlling and supervising electronic devices which overcomes the deficiencies of the methods known so far, or it is easily re-usable to control other devices with different peripheral units or with the peripheral units arranged in a different manner.

A further object of the present invention is to provide a method for controlling and supervising electronic devices which, once a starting time interval has elapsed, is independent of the controller, thus making easier the factory testing operations and the installation on field.

It is also an object of the present invention to provide an apparatus for controlling and supervising electronic devices which overcomes the deficiencies of the systems known so far.

It is a further object of the present invention to provide an apparatus for controlling and supervising electronic devices which, once a starting time interval has elapsed, is independent of the controller, thus facilitating the testing operations in the factory and the installation in the field.

These and further objects and advantages are achieved by a method and apparatus as claimed in the appended claims. All the claims are intended to be an integral part of the present description.

The basic idea of the present invention consists in using a distributed control system based on the data interchange between control entities dedicated to the management of system portions or peripheral units. A further peculiarity is given by the fact that data are sorted in registers, all the registers having the same size (namely, the same number of bits) apart from the typology and size of the data.

The invention will certainly become clear after reading the following detailed description, given by way of a mere non limiting example, to be read with reference to the attached drawings.

BEST MODE FOR CARRYING OUT THE INVENTION

Figure 1:
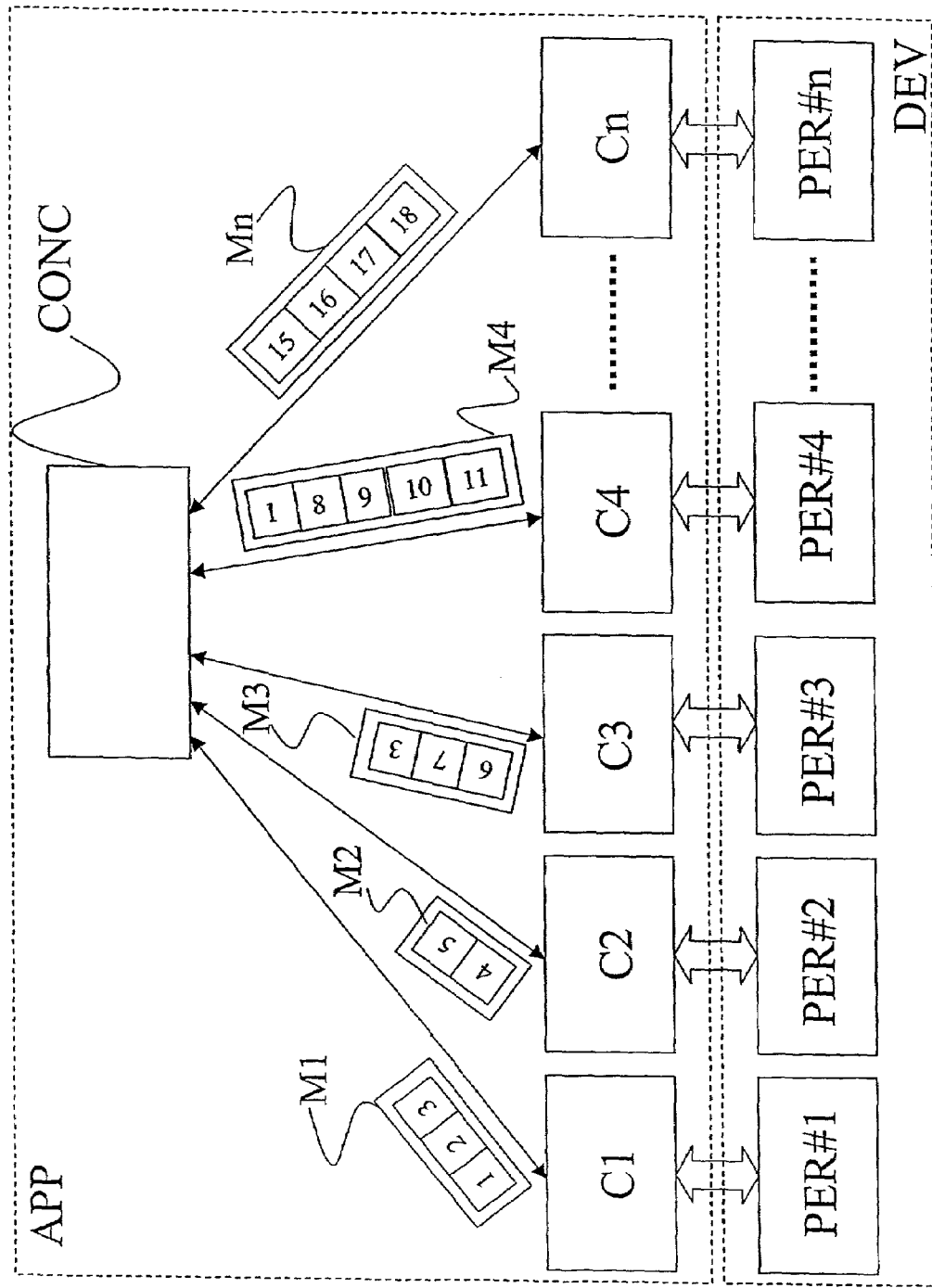
FIG. 1 schematically shows the state of the art configuration with distributed controllers and concentrator.
Figure 2:
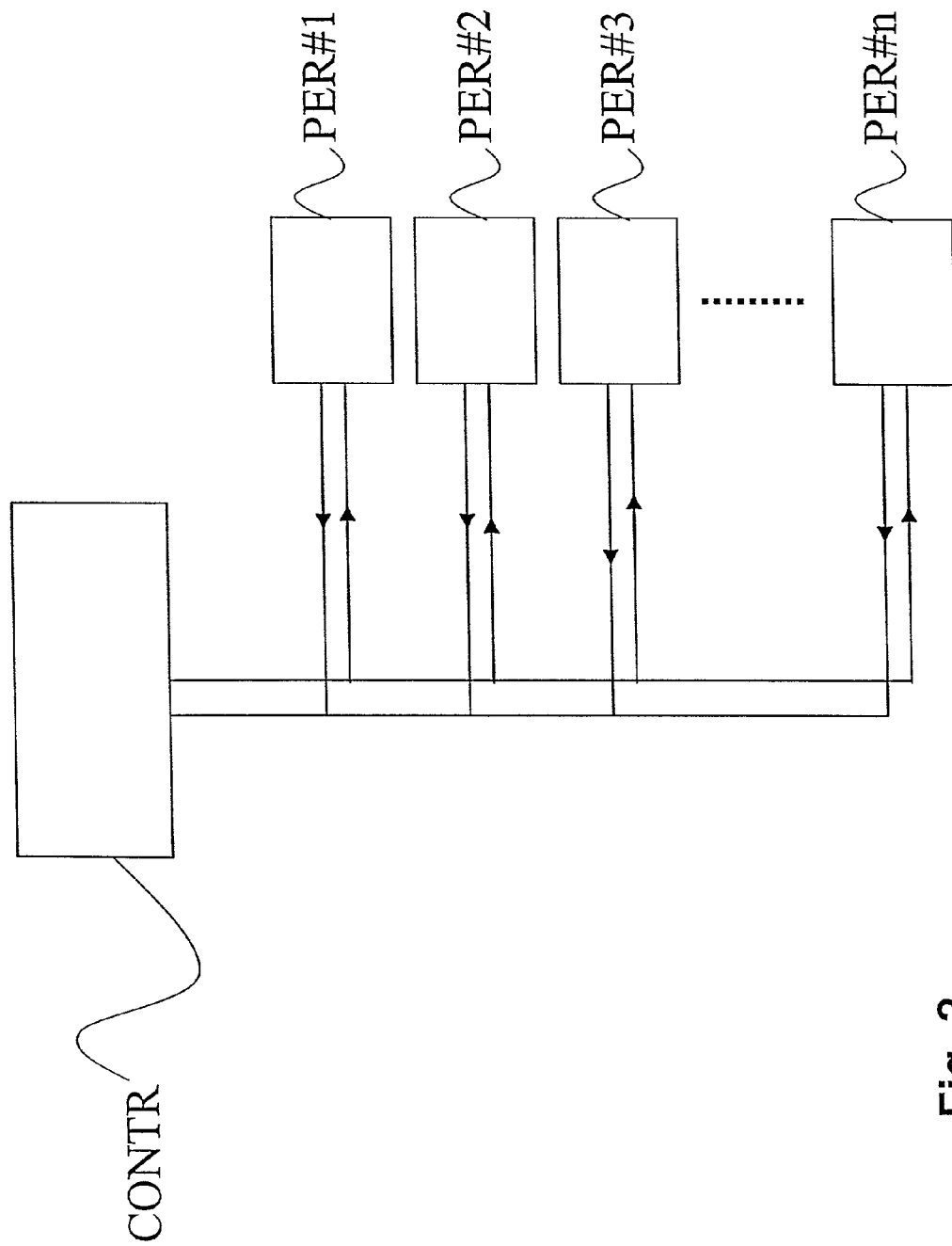
FIG. 2 schematically shows the state of the art configuration comprising a simple controller that directly controls the peripheral units.

For better clarity, before describing the present invention, the known control and supervision apparatus and methodologies will be briefly described again with reference to FIG. 1 and FIG. 2.

The first known methodology (FIG. 1) provides for a plurality of controllers (C1, C2, C3, . . . , Cn), in the illustrated case there is a controller for every peripheral unit (PER#1, PER#2, PER#3, . . . , PER#n) forming the system or electronic device (DEV) to be controlled. As it can be easily noticed, the messages M exchanged between the concentrator CONC and the controllers C are structured in a different way according to the typology of the handled data and the features of the communication protocol adopted. The messages handled by each controller will contain only data essential to the controller to be able to manage the system portion assigned thereto and therefore they will have a format and an information content that is pre-established at the beginning and that can not easily be changed.

In the second known configuration, on the contrary, there is a unique controller (CONTR) that is interconnected, via a bus, to the various peripheral units PER#1, PER#2, . . . , PER#n.

As said above, the basic idea of the present invention consists first in using a distributed control system based on data interchange between controllers which are dedicated to the management of system portions, i.e. one or more peripheral units.

A further peculiarity is given by the fact that data are sorted in registers (REG#1, REG#2, REG#3, . . . , REG#n) all having the same size (namely, the same number of bits) apart from the typology and the size of the data. All the messages M that are exchanged between the concentrator and the various controllers have the same format. Every controller, however, will validate only the data which it is able to provide or which it needs to know.

For better clarity, without restricting anyway the scope of the invention, the following description will particularly refer to the control/supervision of devices used in telecommunications radio relay systems (typically, devices for receiving, transmitting and processing telecommunication signals).

The control and supervision of an electronic device, and in particular of a device for radio relay systems, implies the step of exchanging a plurality of data (1, 2, 3, . . . ) typically of different nature and size. In accordance with the invention, such data are sorted in registers (REG#n) of a pre-established size. By way of example, each register REG#n could have a length of six bytes. The set of all data, sorted in registers, forms a data set P (FIG. 3).

Each single data (1, 2, 3, . . . ) will thus be univocally identified by the register ID, REG#x (with $1 \leq x \geq n$), of the register that contains it and by a bit (or byte) interval that identifies the position of the data inside the register and consequently its size. Such a classification will be performed only once for each data to be handled, apart from the architecture of the system to be controlled and apart from the peripheral unit which will be associated therewith.

The same data will occupy a unique position inside a unique register and, moreover, any register position will contain one data at most, whatever the controlled system may be.

Figure 3:
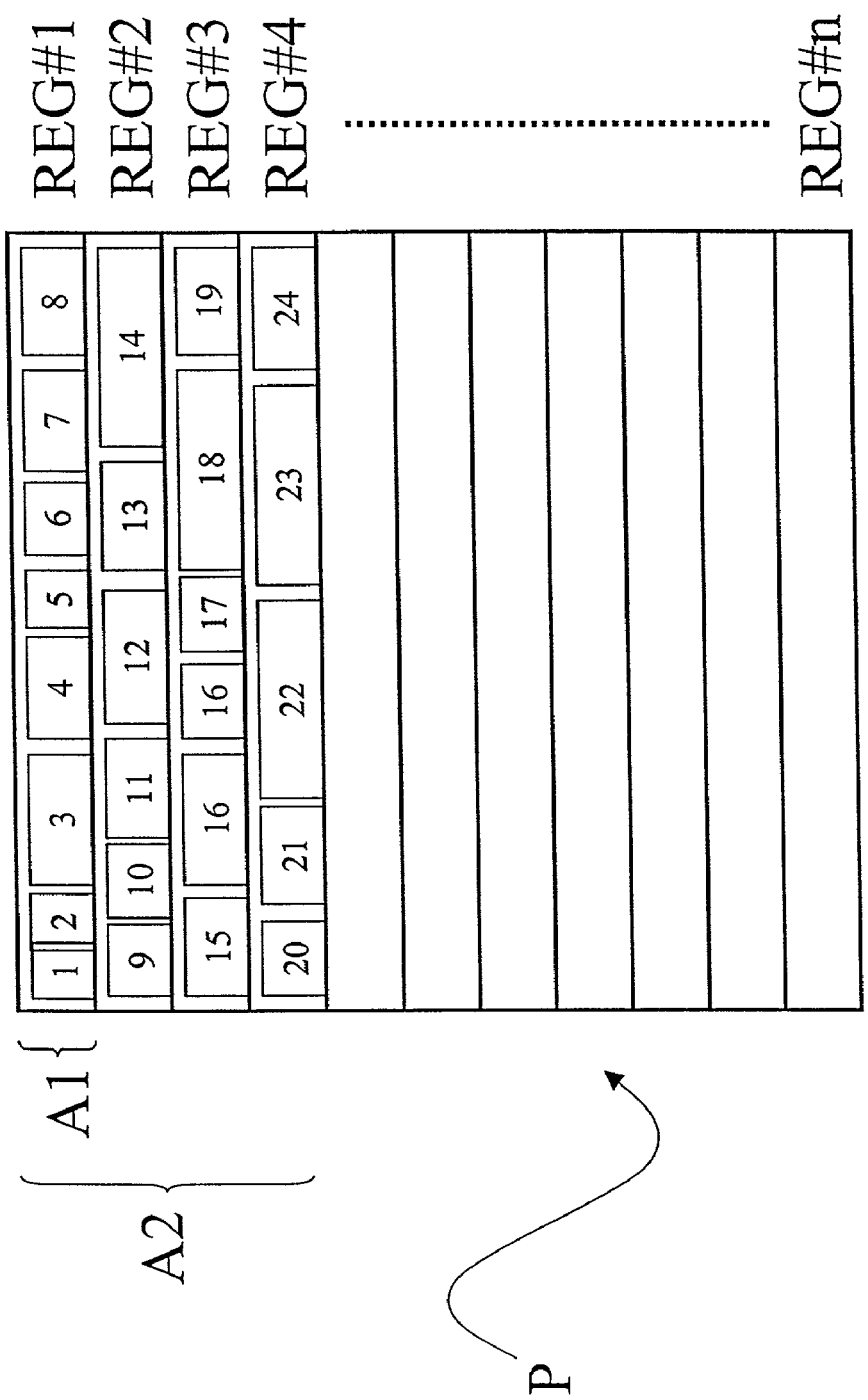
FIG. 3 diagrammatically shows the overall set of data that the various controllers of the present invention exchange with the concentrator.

In FIG. 3 all data have been represented by means of boxes having a different size and inserted into registers or larger "containers" of fixed size. A finite set of elements (data) is thus obtained.

Each typology of controlled device (DEV) is defined by a subset A of elements of P. In other words, typically every device to be controlled and supervised generates/requires a number of data less that P: For instance, in principle a radio relay system has the possibility to transmit through a number of radio channels but a transceiver is often provided in an under-equipped arrangement, namely in a configuration that allows the transmission over a lower number of channels and/or with reduced alarms.

The controller CONC according to the invention is aware of the format of P and therefore is capable of handling data of any different set of peripheral units, all data being described as a subset of P.

With reference to FIG. 3, the subset A1 comprises data (1 to 8) of the first register whereas A2 comprises the data (1 to 24) of the first four registers. In a fully equipped device configuration, A will coincide with P and it will comprise the data of all the registers.

A "use relation", denoted by r, will now be defined, such a use relation assigning to each controller the data belonging to registers contained in the subset A defining the system to be controlled.

Each data of subset A will therefore be r-related to at least one controller belonging to the system. In the case depicted in FIG. 3 and FIG. 4, the subset of data essential to the control/supervision of a device comprising n peripheral units (PER#1, . . . , PER#n) is the subset Al (register REG#1) which comprises the data 1, 2, 3, . . . , 8. The data 1 is related to controller C1 and to controller Cn; data 2 is related to C1 only; data 3 and 4 are related to C2 only, data 5 is related to C2 and Cn; data 6 is related to C3 and Cn; finally, data 7 and 8 are related to C3 only.

For each data which is related to the use relation r, every controller C must further specify the direction of the information flow from and/or towards it. In other words, data 1 could be produced by C1 and used by Cn; data 5 could be produced by Cn and used by C2, an so on. The concentrator, from the analysis of these pieces of information determines, for each data of the system, what is the source entity (source controller) and what are the destination entities (destination controller(s)).

Then, a logic interconnection network is defined between the data of the various controllers that perform the whole information flow according to the aforesaid relations r. Once the interconnection network is established, each entity may know which further entities, if any, wish to use data produced thereby. In other words, each controller knows to which controller(s) a data item produced by it shall be sent and also, when the data item is produced by a different controller, from which controller the data item will be received. In this way, should for instance a further controller Cx, that necessitates data 1 produced by C1, be added, one should take care of only one part of the software of Cx and not of that of C1, Cn or concentrator, unlike what happened in the past. Moreover, the variation of the value of a data in the system leads to the updating of the same in all the entities using it.

The concentrator, by defining a global use relation R over all the data of A, is able to access all data of the system.

The supervision software is capable of handling all the data belonging to P which will not change for any system typology that is characterized as a subset A of P.

Figure 4:
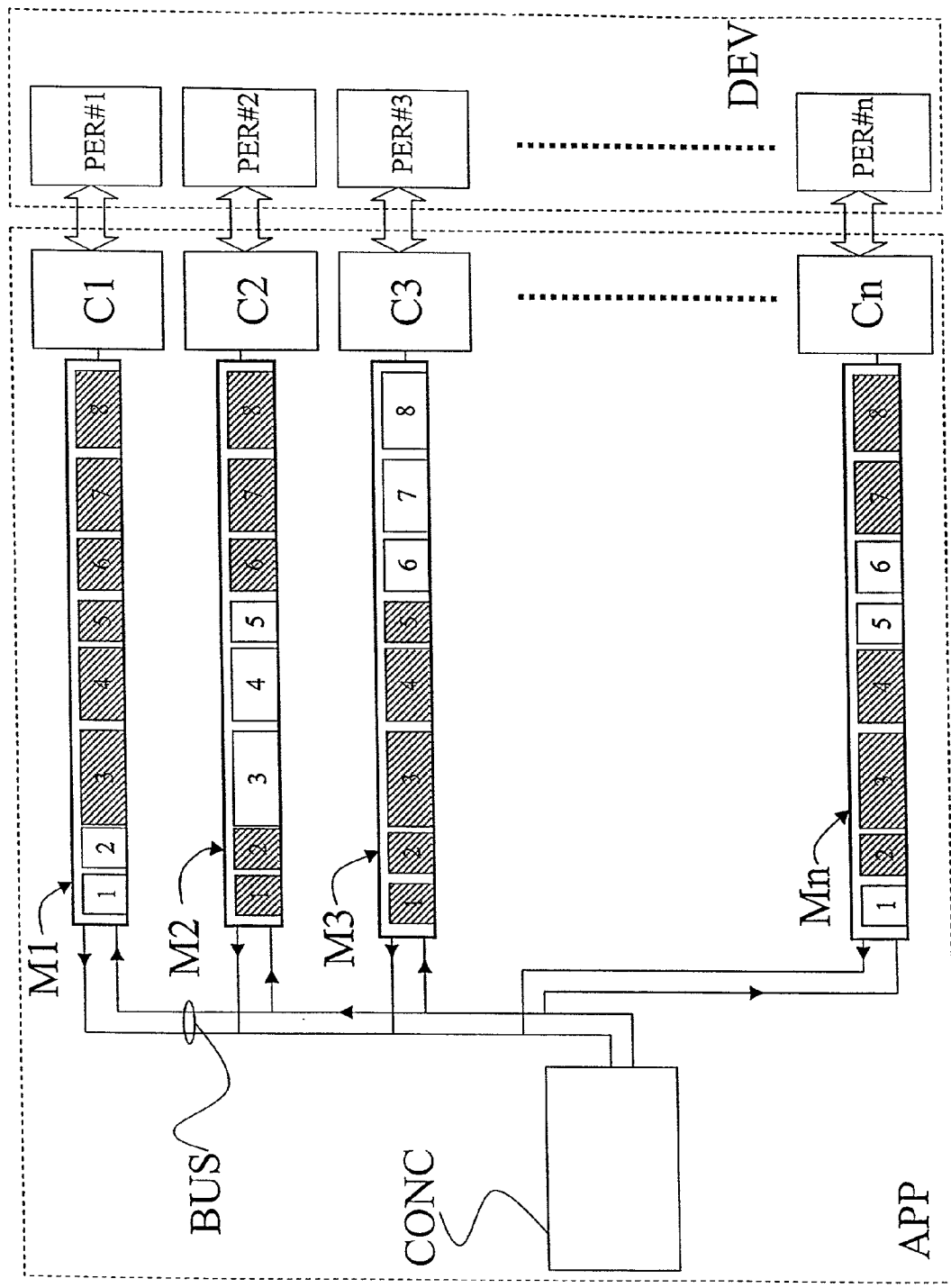
FIG. 4 diagrammatically shows the configuration of the apparatus of the present invention.

As said above, each controller C of the apparatus APP exchanges messages M of the same register format with the concentrator CONC. In the case illustrated, all the data for the supervision of the system are contained in the subset A1, i.e. in the first register REG#1 of P. The messages M1, M2, . . . , Mn exchanged will have a single register format. The further peculiarity is represented by the fact that every controller C will write or read only at special locations of such registers where there are data which it is in relation with. Thus, according to what said above, C1 will write only in the interval assigned to data 1 and read in the interval assigned to data 2, without taking care of the rest of the register (which in FIG. 4 is represented by oblique hatching).

The apparatus APP according to the present invention, in addition to what said above, further comprises a communication bus (BUS) for interconnecting all the various controllers C one to each other. The adopted communication protocol shall transfer the registers among the controllers through messages M. Typically, each controller C comprises a microprocessor. Basically, the application software of the various controllers is the same, only the use relation r relating the various data of the subset A to them is different.

The advantage lies in that a unique application software which implements a controller is to be designed. Such a software, upon reception of any data, will call a procedure external to such a software, expressly realized for the handling of the specific data received for the specific peripheral unit controlled.

Moreover, for every data produced by that specific controller, a procedure external to such a software, expressly realized for the acquisition of the specific data to be sent, will be called. The interconnection network will guarantee the data updating on all the controllers that use it.

Thus, every controller C will have at its disposal a modular software composed as follows: a control module SW1 which is equal for all the controllers and fully independent of the handled data; a module SW2 for processing each single data and which is employable in any controller handling such a data; and a platform module SW3, such a module being the same for hardware of the same type, capable of driving the peripheral units.

The concentrator CONC comprises first means (for instance implemented via software) performing the functions of use relation acquisition and interconnection network set up, and second supervision means (possibly being realized via software as well) specific for that type of device.

At the startup of the apparatus, each controller C transfers its use relation r to the concentrator or supervision entity CONC.

The set of use relations r that are received by each controller allows the supervision entity to know A, namely the data of the controlled system.

In a complete apparatus, a supervision entity CONC and at least one control entity C will be present, hence all the data of set A characterizing the controlled device will be present in at least two entities at the same time.

After a first startup, the control system becomes independent of the supervision entity CONC, the logic connections between the entities that control the system being already established. Therefore, in a "static" condition, the concentrator or supervision entity is no longer necessary. This results in a big advantage since the steps of configuring and testing the apparatus could be carried out at the factory and the installation in field would not require to repeat such operations.

Should a new controller be inserted in the control/supervision apparatus according to the invention (for instance because the device to be controlled, partially unequipped at the beginning, has become fully equipped), a new interconnection network will be defined, thus increasing the cardinality of the set A (for instance passing from A1 to A2), if the new controller utilizes data of P not belonging to A.

The format of the controlled data, which is the same for any data typology and for any system typology, permits of realizing the software of the entities and of choosing a communication protocol among them, without having to know what system has to be controlled.

Once all the controllable data (i.e. the P) are defined, a software module capable of managing all the data contained in the set P and hence totally re-employable for the control of any electronic device whose data to be controlled are contained in A, defined as subset of P, will be developed.

The result is that, in order to control a further device having the same data but a different association between the peripheral units and the handled data, no reorganization of the messages is necessary and a complete re-employment of the software which was developed for the first device is possible.

After a first startup, the apparatus is no longer dependent on the supervision entity, which can even be removed without jeopardizing the control functionalities.

Furthermore, any physical modification of the system peripheral units does not require any change in the supervision software.

Having defined the data in an univocal format, it is possible to realize application programs for the simulation, testing and generation of totally re-employable data structures for any device typology realized which is completely independent of the control architecture utilized.

At this point one could argue that the present invention does not utilize an optimal format of the messages used for the interconnection between the controllers. In the worst case, a certain device would provide for the use of only one data for each register, and this would imply a waste of storage and a reduction in the efficiency of the communication protocol utilized. Such a disadvantage is however irrelevant when defining a suitable size of the registers and a homogeneous definition of data also considering that the modern technologies permit of having low cost memories and high-speed data transfer.

The method and apparatus according to the invention provide for a large re-employment of the software developed for previous devices, thus reducing the development and testing times.

There have thus been shown and described a novel method and a novel apparatus for controlling/supervising electronic devices, in particular transceivers for radio relay systems, which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for controlling and supervising an electronic device, comprising one or more peripheral units, through an apparatus comprising at least two controllers, said method comprising the steps of:
controlling each peripheral unit of the device by means of a controller of said at least two controllers;
identifying a plurality of data items which have to be handled in order to carry out control and supervision of the device;
generating/receiving messages of the same pre-established format, through said controllers, each message containing one or more of said data items to be handled;
connecting said controllers through a common bus; and
interchanging the data items between said at least two controllers through said common bus,
wherein the pre-established format of said messages generated by/received from the controllers is substantially independent of the size of data items contained therein.

2. A method according to claim 1, wherein the step of identifying a plurality of data items which have to be handled comprises the step of arranging all data in storage registers, each register having the same size, each data item being univocally identified by an identifier of a register containing it and by an identifier that identifies a position of the data item inside the register itself.

3. A method according to claim 2, wherein it further comprises the step of identifying a subset of data arranged in registers, said data subset being composed of one or more registers and corresponding to data for control/supervision of a partially equipped device.

4. A method according to claim 1, wherein it further comprises the steps of:
providing a concentrator connected to said one or more controllers by said common bus; and
providing said concentrator with information concerning said data items and their arrangement in registers.

5. A method according to claim 4, wherein the step of providing said concentrator with information comprises the steps of defining use relations between each of said data items and at least one controller specifying an information flow direction relative to a supervision entity producing or using said data item.

6. A method according to claim 5, wherein each controller validates only a pre-established part of a message, in accordance with the corresponding use relation.

7. A method according to claim 4, wherein it further comprises a step of disconnecting said concentrator once a start up step is finished.

8. A method according to claim 1, wherein it further comprises a step of providing each of the controllers with a computer software program, said software program comprising: a first control module, which is the same for all the controllers and independent of the handled data; a second processing module for each single data item and which is usable in any controller that handles such a data item; and a platform module which is the same for all the hardware of the same type, capable of driving the peripheral units.

9. A method according to claim 1, wherein said device is a device for receiving, transmitting and processing signals in radio relay systems.

10. A computer software program comprising program code means designed to carry out the steps of claim 1 when said program is run on a computer.

11. A computer-readable medium having a computer software program recorded thereon, said computer-readable medium comprising program code means designed to carry out the steps of claim 1 when said program is run on a computer.

12. An apparatus for controlling and supervising, through the handling of a plurality of data items, an electronic device, the device comprising one or more peripheral units, the apparatus comprising:
at least two controllers, each peripheral unit being controlled through a controller; and
means for generating/receiving, through said controllers, messages of the same pre-established format, each message containing one or more of said data items to be handled,
wherein it further comprises a common bus connecting said controllers to each other, said bus providing interchange of data items between said controllers, and
wherein the same pre-established format of said messages generated/received by the controllers is substantially independent of the size of data items contained therein.

13. An apparatus according to claim 12, wherein it further comprises storage registers for storing therein the data items to be handled, each register having the same size, each data item being univocally identified by an identifier of the register containing it and by an interval identifying the position of the data item inside the register itself.

14. An apparatus according to claim 10, wherein it further comprises a concentrator connected to the controllers via a common bus, said concentrator receiving information concerning said data items and their arrangement in registers.

15. An apparatus according to claim 12, wherein each controller comprises a computer software program, said software program comprising: a first control module, with the first module being the same for all the controllers and unrelated to the handled data; a second processing module for each of said data items and which is usable in any controller handling such a data item; and a platform module, with said platform module being the same for hardware of the same type, capable of driving the peripheral units.

16. An apparatus according to claim 12, wherein said device to be controlled/supervised is a device for receiving/transmitting and processing signals in radio relay systems.

17. A method for controlling and supervising an electronic device, comprising one or more peripheral units, through an apparatus comprising at least two controllers, said method comprising the steps of:
controlling each peripheral unit of the device by means of a controller of said at least two controllers;
identifying a plurality of data items which have to be handled in order to carry out control and supervision of the device;
generating/receiving messages of a pre-established format through said controllers, each message containing one or more of said data items to be handled; and
connecting said controllers through a common bus;
wherein the pre-established format of said messages generated by/received from the controllers is substantially independent of the size of data items contained therein;
wherein it further comprises the steps of:
providing a concentrator connected to said one or more controllers by said common bus; and
providing said concentrator with information concerning said data items and their arrangement in registers;

wherein the step of providing said concentrator with information comprises the steps of defining use relations between each of said data items and at least one controller specifying an information flow direction relative to a supervision entity producing or using said data item.

wherein each controller validates only a pre-established part of a message, in accordance with the corresponding use relation.

* * * * *